Figures 1, 2:
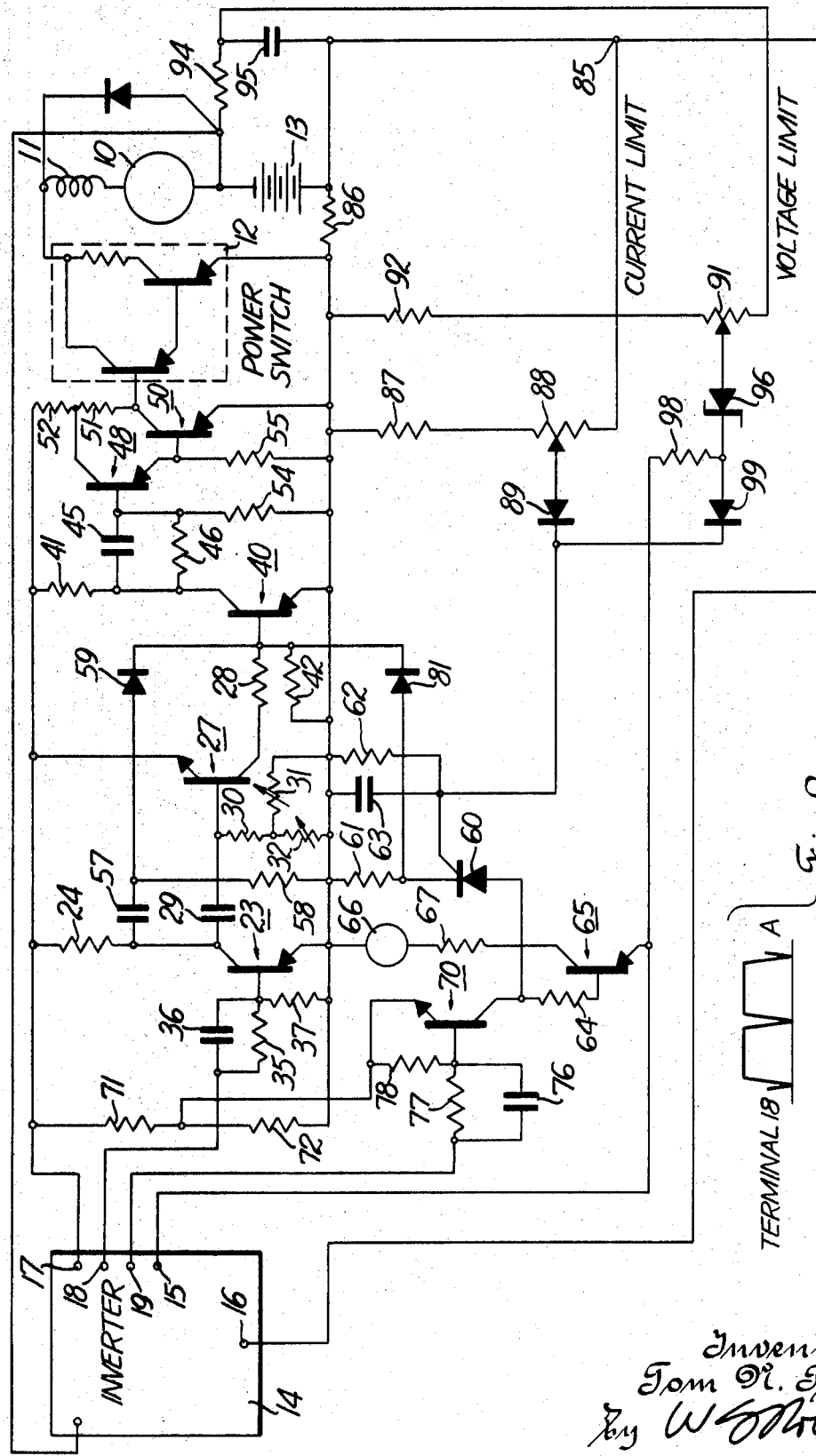

United States Patent

[11] 3,569,810

| [72] | Inventor | Tom N. Thiele<br>Oconomowoc, Wis. |
|---|---|---|
| [21] | Appl. No. | 789,629 |
| [22] | Filed | Nov. 20, 1968 |
| [45] | Patented | Mar. 9, 1971 |
| [73] | Assignee | Allis-Chalmers Manufacturing Company<br>Milwaukee, Wis.<br>Continuation of application Ser. No.<br>232,462, Oct. 23, 1962, now abandoned. |

[54] PULSE WIDTH MODULATOR WITH PULSE WIDTH LIMITING
19 Claims, 2 Drawing Figs.

[52] U.S. Cl. ............................................ 318/341,
318/434, 307/265
[51] Int. Cl. ............................................ H02p 5/06
[50] Field of Search............................................ 318/332,
341, 434; 307/265; 332/9, 10

[56] References Cited
UNITED STATES PATENTS

| 3,191,113 | 6/1965 | Gargani | 318/341X |
| 3,214,666 | 10/1965 | Clerc | 318/341X |
| 3,284,688 | 11/1966 | Black | 318/332 |
| 2,753,507 | 7/1956 | Dodington | 318/341 |
| 2,885,621 | 5/1959 | Brown | 318/434 |

*Primary Examiner*—Oris L. Rader
*Assistant Examiner*—Robert J. Hickey
*Attorneys*—Joseph E. Kerwin, Robert B. Benson and W. S. Robertson

ABSTRACT: A power control circuit for a battery-operated DC traction motor having an inverter providing a series of reference pulses defining periods therebetween, a pulse width modulator receiving said reference pulses and including a monostable multivibrator for generating a power pulse at sometime after the start of the period, power switch transistor means responsive to said power pulses to connect the motor with the battery source, and a pulse width limiting circuit including a controlled rectifier for prenaturely terminating the power pulse within the period in response to sensing of a predetermined overcurrent condition of the motor or power switching transistor means during said period.

PATENTED MAR 9 1971

3,569,810

Inventor
Tom N. Thiele
By W.S. Robertson
Attorney

PULSE WIDTH MODULATOR WITH PULSE WIDTH LIMITING

This application is a continuation of my application Ser. No. 232,462 filed Oct. 23, 1962, now abandoned.

This invention relates generally to a pulse width modulating circuit. More specifically this invention relates to a circuit for producing a succession of generally rectangular pulses and for independently varying the point where the leading edge and the trailing edge of the pulses occur. The invention will be described specifically as a static power modulator for a DC motor of a forklift truck or similar device, and the invention includes accessory circuits for using the modulating circuit in the control of a lift truck.

One of the most satisfactory ways to modulate power in an electrical system is to operate a static switch device to break up the load voltage wave form into a series of on and off pulses. Controlling the switch device for the proper relation between the on time and the off time establishes the desired average voltage at the load. Preferably, the switch device is given enough current handling ability for most load conditions but not as much as would be required for some relatively uncommon conditions. For example, a forklift truck may sometimes be driven against a stalled load where its motor draws much more current than after the truck starts moving. It is desirable to limit the current in such a situation. In a pulse width modulating control this requires limiting the width of the pulses.

For a power switch with transistors, the most significant limiting requirement is that the transistors must have enough base drive to operate in the switching mode where their dissipation is low. The control should prevent the load current from exceeding the value at which the available base drive keeps the transistors in saturation. Whenever the supply voltage falls, the available base drive is reduced, and the control should limit the pulse width to the value at which the reduced base drive keeps the transistors in saturation. Thus, over current limit and under voltage limit are significant applications of pulse width limiting in a power modulating control.

A pulse width modulating circuit can be connected to vary the pulse width in response to several inputs from the load circuit or from other circuits, and the prior art has suggested applying current limit signals to retard the turn on point of the power stage to limit the load current. Because pulse width modulating controls of the known prior art establish only the turn on point for the power switch and thereafter lose control of the circuit until the next cycle, they do not respond to electrical conditions within one period. In many situations these circuits are not satisfactory because the transistors of the power switch can burn out in a single period.

The circuit of this invention includes a pulse width modulator that varies the turn on time of the power switch within each period. Other circuit devices respond to instantaneous conditions in the circuit, such as a supply voltage and the collector current, and turn off the power switch to limit the width of the pulses.

One object of this invention is to provide a new and improved pulse width modulating circuit.

Another object of this invention is to provide a circuit that independently varies the leading edge and the trailing edge of a periodic pulse in response to various inputs.

Another object to this invention is to provide a transistor pulse width modulating circuit in which all of the transistors operate in the switching mode.

Another object of this invention is to provide an improved static control for a power switch that variably energizes a motor or similar device.

Another object of this invention is to provide a static control for power transistors that limits the conduction time of the power transistors in response to electrical conditions of the load and the controlling circuits.

Another object of this invention is to provide an improved control system for a lift truck.

The drawing and the detailed description of the invention will suggest other objects and advantages.

In the drawing:

FIG. 1 is a schematic of the circuit of this invention and some of the associated circuits that might be used when the invention is applied to the control system of a motor for a fork lift truck or similar device; and FIG. 2 shows a series of wave forms associated with various points of FIG. 1.

AN ASSOCIATED SYSTEM

FIG. 1 shows the circuit of this invention in a system that is intended to control the speed of a forklift truck. The truck has a DC motor with an armature 10 and a series field winding 11. A power switch 12 connects the motor to a source 13 in response to a signal at the input of the power switch. Power switch 12 preferably comprises a number of power transistors connected in parallel and driver transistors connected as the single power transistor and driver are shown in FIG. 1. The truck may include an inverter 14 that is connected to source 13 to provide electrical power for accessories of the truck. Inverter 14 may be connected to provide a source of filtered DC for the pulse width modulating circuit at positive terminal 15, common terminal 16 and negative terminal 17. Inverter 14 preferably also provides full-wave rectified positive unfiltered DC at terminal 18 and negative full-wave rectified unfiltered DC at terminal 19. The unfiltered DC shown in FIG. 2, provides synchronized positive and negative timing pulses for the pulse width forming circuit. The components of the system that have been described so far illustrate applications for the pulse width modulating circuit. Many other applications will be apparent after the pulse width modulating and limiting circuit has been described in connection with the specific system of FIG. 1, and other applications will be suggested later in this description.

THE PULSE FORMING CIRCUIT

The pulse width modulating and limiting circuit of this invention includes a monostable circuit that establishes the position of the leading edge of a pulse with respect to a periodic reference. This part of the modulator is generally similar to part of the circuit of my U.S. Pat. No. 3,443,120 assigned to the assignee of this invention. The circuit includes a transistor 23 that has its emitter terminal connected to the common terminal 16 of source 14 and has its collector terminal connected to the negative terminal 17 of source 14 by a collector resistor 24. As will be explained later, transistor 23 is connected to be turned on by a timing pulse at the beginning of each period. The pulse forming circuit includes a second transistor 27 that has its emitter terminal connected to negative terminal 17 of source 14 and has its collector terminal connected to terminal 16 through a resistor 28 and the base-emitter circuit of a transistor 40 in the amplifying stage that will be described later. A capacitor 29 connects the collector terminal of transistor 23 to the base terminal of transistor 27. When transistor 23 turns on momentarily at the beginning of each period, it connects capacitor 29 to be charged to the potential of terminals 16, 17 in a circuit that comprises the emitter-collector circuit of transistor 23 and the base-emitter circuit of transistor 27. When transistor 23 turns off, very shortly after the beginning of the timing period, resistor 24 connects the positively charged terminal of capacitor 29 to the negative terminal 17, and the voltage across capacitor 29 appears between the base and emitter terminals of transistor 27 in a polarity to turn off transistor 27. An adjustable resistance circuit is connected to discharge capacitor 29 at a selected rate so that transistor 27 will turn on again after a selected time delay. The drawing illustrates the adjustable resistance circuit as the series combination of a fixed resistor 30 and a variable resistor 31 that connect the base terminal of transistor 27 to terminal 16 and a variable resistor 32 that is connected between common connection of resistors 30, 31 and positive terminal 16. Preferably variable resistor 32 is arranged to be manually adjustable to control the output of the circuit and variable resistor 31 is intended to be adjusted only to trim the circuit. At the end of the timing period when capacitor 29 has discharged to cause the base of transistor 27 to become negative with respect to the emitter, transistor 27 turns on.

THE TIMING PULSE CIRCUIT

Any suitable signal source is connected to turn transistor 23 on momentarily at the beginning of each period. In the system of FIG. 1 the full-wave rectified, unfiltered, output at terminal 18 of inverter 14 provides a series of narrow negative going pulses (FIG. 2) where commutation occurs in the inverter. These voltage spikes will be called timing pulses.

The parallel combination of a resistor 35 and a capacitor 36 connect the base terminal of transistor 23 to positive unfiltered terminal 18. A resistor 37 connects the base terminal of transistor 23 to common terminal 16. Capacitor 36 and resistor 35 speed up turning on transistor 23. Also, capacitor 36 charges to an average value with the terminal connected to the base somewhat negative with respect to terminal 18 so that the base terminal of transistor 23 goes negative during the voltage spikes although the full wave rectified form at terminal 18 does not go more negative than zero.

THE AMPLIFIER

A suitable circuit is connected to receive the rectangular current wave form produced in the collector circuit of transistor 27 and to receive other inputs that will be described later and to amplify these signals sufficiently to operate power switch 12. The amplifier that the drawing illustrates comprises a transistor 40 having its emitter connected to the common terminal 16 and its collector connected to negative terminal 17 by a resistor 41. The base of transistor 40 is connected to the collector of transistor 27 of the pulse forming circuit by means of resistor 28 in the pulse forming circuit. A resistor 42 connects the base of transistor 40 to the common terminal 16 to reduce off leakage at higher temperature by providing an alternate $I_{co}$ path. When transistor 27 turns on at the end of the timing period, transistor 40 also turns on. The parallel combination of a capacitor 45 and a resistor 46 couples the potential at the collector terminal of transistor 40 to the base terminal of a transistor 48. The collector terminal of transistor 48 is connected to the collector circuit of a transistor 50 and the emitter terminal of transistor 48 is connected to the base of transistor 50. Resistors 51, 52 connect the collector of transistor 50 to negative terminal 17, and the emitter of transistor 50 is connected to common terminal 16. Resistor 51 in the load circuit of transistor 50 keeps transistor 50 in saturation when it is turned on. Resistors 54, 55 connect the base terminals of transistors 48 and 50 to common terminal 16 to decrease the turnoff time of transistors. When transistor 48 turns on, it conducts the base current for transistor 50 in its emitter-collector circuit and it turns on transistor 50. Thus, the amplifier of FIG. 1 produces a negative output at the collector terminal of transistor 50 when transistor 27 is on and it produces a zero output when the pulse forming circuit is in its unstable mode and transistor 27 is off.

THE BLANKING CIRCUIT

When transistor 23 turns on momentarily at the beginning of each timing period, it conducts in a circuit with capacitor 29 and the base-emitter junction of transistor 27 and thereby turns on transistor 27 momentarily. As the circuit has been described so far the timing pulse would appear at the output of the amplifier. Without pulse width limiting this is acceptable because transistor 27 conducts until the end of the timing period and the short timing pulse would merge with the power output pulse. As will be explained later, the pulse width limiter operates to advance the trailing edge of the pulse so that it is spaced from the point where the timing pulse would occur. Ordinarily it is undesirable to turn on power switch 12 momentarily at the timing pulse.

A capacitor 57 and a resistor 58 are connected in series across the emitter-collector terminals of transistor 23 to receive the timing pulse. During the relatively long time in each period that transistor 23 is turned off, capacitor 57 charges in series with resistor 24 and resistor 58 so that the terminal connected to the collector of transistor 23 is negative and the terminal connected to resistor 58 is positive (this is the same condition as capacitor 29). When transistor 23 turns on momentarily, it connects the negatively charged terminal of capacitor 57 to common terminal 16 so that its positively charged terminal is positive with respect to terminal 16 by the voltage source 14. This is the proper polarity to turn off transistor 40 in opposition to the collector current of transistor 27 which tends to turn on transistor 40 during the timing pulse. A diode 59 couples the positively charged terminal of capacitor 57 to the base terminal of transistor 40. Diode 59 isolates the base terminal of transistor 40 from resistor 58 and capacitor 57 except for the blanking pulse.

THE PULSE WIDTH LIMITING CIRCUIT

The circuit of this invention limits the width of each pulse in response to circuit conditions during the same period. This circuit indicates the time at which a preset condition occurs and in this respect is the dual of a sample data system which indicates the value of a quantity at a preset time. The pulse width limiting circuit includes a controlled rectifier 60 that is gated at the appropriate time in the period to apply a turnoff potential to the base terminal of transistor 40. A resistor 61 connects the cathode terminal of controlled rectifier 60 to common terminal 16. A resistor 62 and a capacitor 63 are connected between the gate terminal and common terminal 16 to prevent controlled rectifier 60 from turning on in response to extraneous pulses. Suitable load means connects the anode terminal of controlled rectifier 60 to positive terminal 15 of source 14. In the circuit of FIG. 1, the anode terminal is connected to terminal 15 through a resistor 64 and the base-emitter circuit of a transistor 65. Transistor 65 turns on when controlled rectifier 60 turns on, and it turns off when controlled rectifier 60 turns off. Transistor 65 is connected to drive an indicator lamp 66 through a resistor 67. As will be explained, lamp 66 turns on to warn the operator of the system that some load condition exists that requires pulse width limiting.

A transistor 70 is connected to apply a negative turnoff pulse to the anode of controlled rectifier 60 to reset controlled rectifier 60 at the end of each period. The collector terminal of transistor 70 is connected to the anode terminal of controlled rectifier 60, and the emitter terminal of transistor 70 is connected to a suitable point of negative potential with respect to common terminal 16. The emitter terminal of transistor 70 may be connected to the common connection of two resistors 71, 72 that are connected between the terminals 16, 17 of source 14. Transistor 70 is coupled to terminal 19 of source 14 to receive positive going timing pulses by means of a capacitor 76 and two resistors 77, 78 that are similar to the timing pulse circuit already described. When transistor 70 turns on it conducts in series with resistor 64 and the base-emitter circuit of transistor 65 between positive terminal 15 and the negative common connection of resistors 71, 72. The negative potential between the two resistors 71, 72 appears at the anode terminal of controlled rectifier 60 and turns it off.

A diode 81 connects the cathode terminal of controlled rectifier 60 to the base terminal of transistor 40. Diode 59 in the blanking circuit and diode 81 form an OR circuit that turns off transistor 40 when a positive voltage is applied to the cathode of either diode 59, 81.

THE OVERCURRENT INDICATING SECTION

Controlled rectifier 60 is gated to limit the width of pulses in response to various circuit conditions such as the load current. With an inductive load such as windings 10, 11, the load current increases continuously during the on time (the time constant of the load is much longer than the switching period) and the load current may exceed the value at which the power switch transistors can be held in saturation. The control turns off the power switch transistors before this condition is reached. Terminal 85 of the current limiting section is connected to receive a voltage that is proportional to the load current. FIG. 1 shows a schematic resistor 86 that represents the low resistance that is distributed in the heavy conductors that connect power switch 12 to source 13. A fixed resistor 87 and a potentiometer 88 are connected across the terminals of conductor 86 to apply a measure of this voltage to the anode of a diode 89. Diode 89 conducts in series with the gate-cathode circuit of controlled rectifier 60 according to the potential at the anode of diode 89 and the volt-ampere characteristics of controlled rectifier 60 and diode 89. These voltage ampere characteristics provide that over a significant range of voltage at terminal 85, the gate voltage of controlled rectifier 60 is not sufficient to turn on the controlled rectifier. When the potential at terminal 85 rises sufficiently (depending on the position of the slider of potentiometer 88), the voltage at the gate of controlled rectifier turns on the controlled rectifier. Thus, the voltage at the anode terminal of diode 89 that is required to turn on controlled rectifier 60 can be considered to be a reference for the collector current of the power transistor of power switch 12. When diode 89 turns on, it gates controlled rectifier 60 which produces a voltage drop across resistor 61. Diode 81 couples the positive voltage at the cathode terminal of controlled rectifier 60 to the base terminal of transistor 40 and turns off transistor 40 and thereby turns off power switch 12.

THE UNDERVOLTAGE INDICATING SECTION

A potentiometer 91 and a fixed resistor 92 are connected in series to receive a measure of the battery voltage. As the drawing illustrates the invention, a resistor 94 and a capacitor 95 are connected to decouple potentiometer 91 and resistor 92 from other components that are connected to the battery. A Zener diode 96 has its anode terminal connected to the slider of potentiometer 91 and has its cathode terminal connected by means of resistor 98 to any suitable positive potential point such as terminal 15. The slider of potentiometer 91 is adjusted so that Zener diode 96 conducts in its reverse direction when the battery has at least the minimum acceptable voltage. Zener diode 96 maintains the potential at its cathode terminal at a fixed value more positive than the slider terminal. Thus, when the slider is adjusted to be somewhat more negative than the value of the voltage across Zener diode 96, the cathode terminal is somewhat negative with respect to common terminal 16. As the battery voltage falls, the potential at the slider and at the cathode terminal of Zener diode 96 becomes less negative with respect to terminal 16. When the slider is properly adjusted, the potential at the cathode terminal at zener diode 96 becomes slightly positive when the battery voltage has fallen to the value at which pulse width limiting should take place. A diode 99 connects the cathode terminal of Zener diode 96 to the gate terminal of controlled rectifier 60. Diodes 89 and 99 make up an OR circuit and either low voltage or high current will turn on one of the diodes 89, 99 and gate controlled rectifier 60.

OPERATION

Suppose that the motor is going to be energized to drive a heavy load at low speeds where the load would require more current than power switch 12 can provide safely. Before beginning such an operation, when the speed control potentiometer 32 is set for zero speed, the delay that is established by capacitor 29 and resistors 30, 31, 32 is longer than the period of the timing signals and capacitor 29 remains continuously charged sufficiently to turn off transistor 27 except when transistor 23 turns on in response to the timing pulse, and the blanking pulse blanks out this signal at the base of transistor 40. As the operator advances speed potentiometer 32, the circuit produces shorter and shorter delays before turn on, and the power switch turns on sooner in each period and thus remains on longer. The current in winding 10 and 11 starts at zero or at some other value at the beginning of each turn on portion of each period and increases exponentially until power switch 12 turns off. If the power switch is turned on very early in the period and the motor is stalled or turning very slowly, the current may reach the value for which potentiometer 88 is set to gate controlled rectifier 60. When the current limit signal gates controlled rectifier 60, controlled rectifier 60 turns off amplifying transistor 40 and power switch 12 and prevents the peak load current from increasing beyond the value established by the position of the slider of potentiometer 88. If the operator attempts to apply power to the motor while it is stalled, the pulse forming circuit would advance the leading edge of the pulse and the current limit section advances the trailing edge of the pulse correspondingly. The pulse would have a uniform width that corresponds to the peak current in the load circuit. As the motor begins to move, the current limit section would retard the trailing edge of the pulse and thus widen the pulse. The operator, of course, could adjust speed control rheostat 32 to retard the leading edge of the pulse to limit the speed of the truck.

The operation of the pulse width limiting circuit during low battery voltage is similar to the current limiting operation that has just been described. When the battery is nearly discharged, its internal resistance is high and the battery voltage falls off during each period. The slider of potentiometer 91 is set so that switch 12 turns off when the battery voltage falls enough to reduce the base drive in power switch 12.

OTHER EMBODIMENTS

As the circuit has been described so far, power switch 12 comprises transistors which are controlled either to turn on or to turn off according to the potential at the collector of transistor 50. Transistor 40 combines all of the inputs that either turn on or turnoff power switch 12. Switch 12 can also comprise devices such as controlled rectifiers which turn on in response to a gate voltage and turn off in response to an anode voltage. For a power switch comprising controlled rectifiers, the outputs of transistor 27 and controlled rectifier 60 are separately connected to control the gate potential and the anode potential of the controlled rectifiers in power switch 12. Circuits for turning off controlled rectifiers in response to the signal at the anode of controlled rectifier 60 are well known.

The pulse limit portion of this circuit can operate with any signal that changes measurably during the on time. (If the signal does not change measurably, controlled rectifier 60 would either turn on at the beginning of a period or not turn on at all during a period.) Many devices have electrical or mechanical time constants that would cause the current or voltage to change measurably during each on time. The control can be connected to respond to nonelectrical characteristics by means of suitable sensors that produce electrical signals.

It is well known to connect transistors or controlled rectifiers or other devices to form a power switch for an alternating current system. When the pulse width modulating and limiting circuit of this invention is used in an alternating current system, it is preferable to full-wave rectify a measure of the system voltage to provide timing pulses for transistors 27 and 70 at voltage zeros in the alternating current system. This waveform is similar to the rectified square wave form of FIGS. 2A and 2B.

A very significant advantage of this circuit as it has been described so far is that all of the transistors operate in the switching mode and not in the linear mode. This feature makes the control less sensitive to variations in the voltage at terminals 15, 16, 17 and to variations in the characteristics of the transistors. Potentiometer 32 makes the circuit changes to vary the turn on point. Other resistance means such as a photocell may be substantial for the mechanically variable resistor that has been suggested. To vary the turn on point in response to electrical signals, a transistor operating in its linear mode can be connected to control the discharge of capacitor 29.

The single embodiment of the invention and the variations that have been described in detail will suggest to those skilled in the art many applications of this circuit and appropriate modifications of the disclosed circuit, which the claims are intended to cover.

I claim:

1. A circuit for producing a periodic generally rectangular pulse having its leading and trailing edges at independently selected points in each cycle comprising:

means for producing a periodic timing signal;

means connected to receive said timing signal and to switch to a predetermined state after an adjustable interval to form a first pulse of one polarity;

means for producing a pulse width limiting signal;

means responsive to said pulse width limit signal to switch to a state to form a second pulse of the opposite polarity;

means connected to receive said first and second pulses and to produce a pulse having its leading edge corresponding to the leading edge of said first pulse and having its trailing edge corresponding to the leading edge of said second pulse; and means connected to be responsive to said timing pulse producing means to reset said pulse width limiting means.

2. A control for periodically turning a power switch on and off at independently selected points in each period, comprising:

means providing a periodic timing pulse and a simultaneous reset pulse;

circuit means connected to receive said timing pulse and to produce a signal to turn on the power switch at a selected delay in the period from said timing pulse;

means connected to receive a pulse width limiting signal and to turn off the power switch in response to said signal, said limiting means remaining in a state to turn off the power switch until reset; and means connecting said pulse width limiting means to receive said reset pulse at the end of each period.

3. A control for periodically turning a power switch on and off at independently selected points in each period comprising:

means providing a timing pulse and a simultaneous reset pulse;

means connected to receive said timing pulse and to produce a signal to turn on the power switch at a selected delay from said timing pulse;

means responsive to an electrical condition in the circuit of the power switch to produce a pulse width limit signal;

pulse width limiting means connected to receive said pulse width limiting signal to turn off the power switch, said limiting means remaining in a state to turn off the power switch until reset; and means connecting said pulse width limiting means to receive said reset pulse at the end of each period.

4. A control for periodically turning a power switch on and off at independently selected points in each period comprising:

means providing a periodic timing pulse and a simultaneous reset pulse;

means connected to receive said timing pulse and to produce a signal to turn on the power switch at a selected point during the period;

means comparing an electrical characteristic of the circuit of the power switch with a reference and producing a pulse width limiting signal when said characteristic has a predetermined value; and pulse width limiting means connected to receive said pulse width limiting signal and said reset pulse and to turn off the power switch in response to the limiting signal and to maintain the power switch turned off until said limiting means is reset.

5. A circuit for periodically turning on and off a semiconductor power switch at selected points in the period, comprising:

means providing a periodic timing signal, a monostable circuit responsive to said timing signal to switch to its unstable mode for a selected part of each period, said monostable circuit producing an output when it switches to its stable mode;

means connected to produce a limit signal indicating that an electrical characteristic of the power switch has reached an undesirable instantaneous value after the switch is turned on; and means connected to respond to said monostable circuit output and the absence of said timing signal to turn on the switch and responsive to said limit signal to turn off the switch.

6. A circuit for periodically turning on and off a transistor switch at selected points in the period, comprising:

means providing a periodic timing signal, a monostable circuit responsive to said timing signal to switch to its unstable mode for a selected part of each period, said monostable circuit producing an output while in its stable mode;

means connected to produce a first signal indicating instantaneous undervoltage in the base drive power supply for the transistor switch;

means connected to produce a second signal indicating instantaneous overcurrent in the circuit of the switch, a pulse width limit circuit having a set state and a reset state and connected to switch to its set state and produce a limit signal in response to said first or second signals;

means connected to respond to the absence of said timing signal, the presence of said monostable circuit output, and the absence of said limit signal to turn on the transistor switch; and means connected to said timing signal means to reset said pulse width limit circuit at the beginning of each period.

7. A power control system comprising:

means providing a periodic reference signal, pulse forming means connected to receive said reference signal and to form a pulse having its leading edge at a selected point in the period;

an electroresponsive load device having a time constant that is long relative to said period;

power switch means for connecting said electroresponsive device to a source of power in response to the leading edge of said pulse;

pulse width limit means connected to turn off said power switch in response to a pulse width limit signal; and means responsive to a characteristic of said electroresponsive device that changes measurably in each period to signal said pulse width limit means to turn off the power switch when said characteristic reaches a predetermined value.

8. A power control system comprising:

means providing a periodic reference, pulse forming means connected to receive said reference and to form a pulse having its leading edge at a selected point in the period;

an electroresponsive device having a time constant that is long relative to said period;

power switch means connecting said device in circuit with an electrical source in response to the leading edge of said pulse;

means responsive to a characteristic of said circuit of said electroresponsive device and said switch means that varies measurably in each period to produce a pulse width limiting signal when said electrical characteristic reaches a predetermined value; and means responsive to said pulse width limiting signal to turn off said switch means for the rest of a period.

9. A power control system comprising, means providing a periodic reference, pulse forming means connected to receive said reference and to form the pulse having its leading edge at a selected point in the period, means for varying the duty cycle of the pulses applied by said motor switching means from said DC source to energize said motor; and means for monitoring the motor current and producing signals to operate said duty cycle varying means to reduce the duty cycle of said power switching means when the motor current reaches a predetermined level.

10. A pulse width modulation system for controlling the speed of DC traction motors comprising:
a. a battery;
b. transistor pulse generating means operated from said battery, having a time constant element and capable of having the pulse duration of the output pulses controlled both by varying said time constant element and by input pulses;
c. transistor amplifying means operated from said battery for raising the output level of pulses supplied by said pulse generating means to a sufficient power level to drive the traction motor;
d. means for controlling the time constant of said pulse generating means so as to control the speed of the motor;
d. means for controlling the time constant of said pulse generating means so as to control the speed of the motor;
e. a unidirectional element connected across said traction motor to provide a current path between pulses; and
f. means for monitoring the motor current and operated from said battery for producing pulses to prematurely terminate the pulse duration of the output pulses from said pulse generating means when the traction motor current reaches a predetermined level.

11. In a speed control system for an industrial truck having a power storage battery:
a. a DC traction motor;
b. switch means for applying variable duty cycle drive impulses to said motor from said battery, said switch means comprising;
c. an oscillator;
d. a control pulse producing circuit triggered by the cycles of said oscillator for producing control pulses of adjustable time duration;
e. a switching circuit energized by said control pulses for applying said drive impulses from said battery to said motor during the time interval of said control pulses; and
f. an adjustable feedback pulse generator circuit triggered by the amplitude of current through said motor during said drive impulses exceeding a preset amplitude for triggering said control circuit to terminate the control pulse then being produced prior to its normal termination.

12. In the speed control system of claim 11, manually controlled means for said control circuit for adjusting the duration of the control pulses thereby to control the duration of the drive pulses applied to the motor.

13. In the speed control system of claim 12, additional manually controlled means for said feedback pulse generator circuit for preselecting the amplitude of motor current required to trigger said feedback pulse generator circuit.

14. A control system for energizing a DC traction motor from a power storage battery by variable duty cycle impulses comprising:
a. a traction motor;
b. a storage battery;
c. cyclically operating transistor switch means for applying DC drive pulses from the battery to energize said motor;
d. manual control means for adjusting the time duration of said drive pulses; and
e. feedback pulse producing means responsive to the amplitude of current through said motor exceeding a preset amplitude during any one of said drive pulses for producing a feedback pulse to said transistor switch means for prematurely terminating the operation of said transistor switch means in advance of its normal time duration.

15. In the motor control system of claim 14, the addition of manual control means for adjusting said feedback pulse producing means to respond to different preset amplitudes of current through said motor.

16. In a system for controlling a DC motor from a DC source,
means for producing a succession of pulses;
power switching means controlled by said pulses for connecting said DC motor to said DC source,
means for varying the duty cycle of the pulses applied by said power switching means from said DC source to energize said motor; and
means for sensing an undesirable operating condition of said power switching means and means responsive to said sensing means for operating said duty cycle varying means to reduce the duty cycle of said pulses.

17. In a system for controlling a DC motor from a DC source,
means for producing a succession of pulses,
power switching means controlled by said pulses for connecting said DC motor to said DC source,
manually controlled means having a variable time constant element for varying the duty cycle of the pulses applied by said power switching means from said DC source to energize said motor,
means to generate a limit signal when an electrical condition of said power switch means reaches an undesirable instantaneous magnitude after said power switching means is turned on, and
means responsive to said limit signal to reduce the duty cycle by terminating said pulses prior to their normal termination.

18. A power system for an industrial truck, comprising:
a battery;
a DC motor;
means to produce a train of unidirectional pulses;
transistor monostable circuit means having adjustable time constant elements driven by said train of unidirectional pulses to produce output pulses for controlling the motor;
amplifying means for raising the power level of the pulses from said monostable circuit means to drive said motor;
means for varying said time constant elements of the monostable circuit means to control the time duration of said unidirectional pulses and thereby vary the truck speed; and
means for monitoring the current supplied to the motor and producing signals to control said monostable circuit means so as to decrease the time duration of said output pulses when the motor current exceeds predetermined level.

19. In a system for controlling a DC motor from a DC source,
means for producing a succession of pulses;
power switching means controlled by said pulses for connecting said DC motor to said DC source;
means for varying the duty cycle of the pulses applied by said motor switching means from said DC source to energize said motor; and
means for monitoring the motor current and producing signals to operate said duty cycle varying means to reduce the duty cycle varying means to reduce the duty cycle of said power switching means when the motor current reaches a predetermined level.

PO-1050
(5/69)

UNITED STATES PATENT OFFICE
CERTIFICATE OF CORRECTION

Patent No. __3,569,810__   Dated __March 9, 1971__

Inventor(s) __Tom N. Thiele__

It is certified that error appears in the above-identified patent and that said Letters Patent are hereby corrected as shown below:

Column 8, line 75, cancel "means for varying the duty cycle"
Column 9, cancel lines 1-6 and insert the following:

--   an electroresponsive load device having a time constant that is long relative to said period, and power switch means for connecting said device in circuit with a electrical source in response to said pulse,
        pulse width limit means connected to turn off s power switch means, and
        means for comparing the current in the circuit said power switch means with a reference and producing a limiting signal when the instantaneous switch current exc a preset value,
        said pulse width limit means being connected to receive said limiting signal and to turn off said power switch means in response to said limiting signal. --

Column 9, lines 21 and 22 were inserted in error and should be cancelled; Column 10, line 52 "exceeds predetermined" should be --- exceeds a predetermined---.

Signed and sealed this 3rd day of August 1971.

(SEAL)
Attest:

EDWARD M. FLETCHER, JR.
Attesting Officer

WILLIAM E. SCHUYLER, J
Commissioner of Patent